United States Patent
Jung

[11] Patent Number: 5,938,984
[45] Date of Patent: Aug. 17, 1999

[54] TEMPERATURE REGULATING METHOD OF A HUMIDIFIER ACCORDING TO A SURROUNDING TEMPERATURE

[75] Inventor: Woong Jung, Suwon, Rep. of Korea

[73] Assignee: Daewoo Electronics Co., Ltd., Seoul, Rep. of Korea

[21] Appl. No.: 08/828,626

[22] Filed: Mar. 31, 1997

[30] Foreign Application Priority Data

Mar. 30, 1996 [KR] Rep. of Korea .................. 96-9396

[51] Int. Cl.⁶ .................. B01F 3/02; G05D 21/00
[52] U.S. Cl. .................. 261/130; 219/510; 236/44 A; 261/142
[58] Field of Search .................. 236/44 A; 261/142, 261/130; 392/441; 219/510

[56] References Cited

U.S. PATENT DOCUMENTS

| | | | |
|---|---|---|---|
| 5,176,856 | 1/1993 | Takahashi et al. | 261/142 |
| 5,546,926 | 8/1996 | Lake | 261/142 X |
| 5,611,967 | 3/1997 | Jane et al. | 261/142 |

*Primary Examiner*—William Wayner
*Attorney, Agent, or Firm*—Jacobson, Price, Holman & Stern, PLLC

[57] ABSTRACT

A temperature regulating method of a humidifier regulates a temperature of water vapor ejected therefrom according to a surrounding temperature. A cool humidification mode is added to a humidification mode of the humidifier, and a temperature of a humidifying tub is detected upon being shifted into the cool humidification mode by a user. Thus, the detected temperature is compared with a temperature preset for performing the cool humidification mode to turn off the heater when the temperature of the humidifying tub is higher than the preset temperature and, turn on the heater otherwise, thereby regulating the temperature of the water vapor ejected from an ejecting slit of the humidifier according to the surrounding temperature thereof.

4 Claims, 3 Drawing Sheets

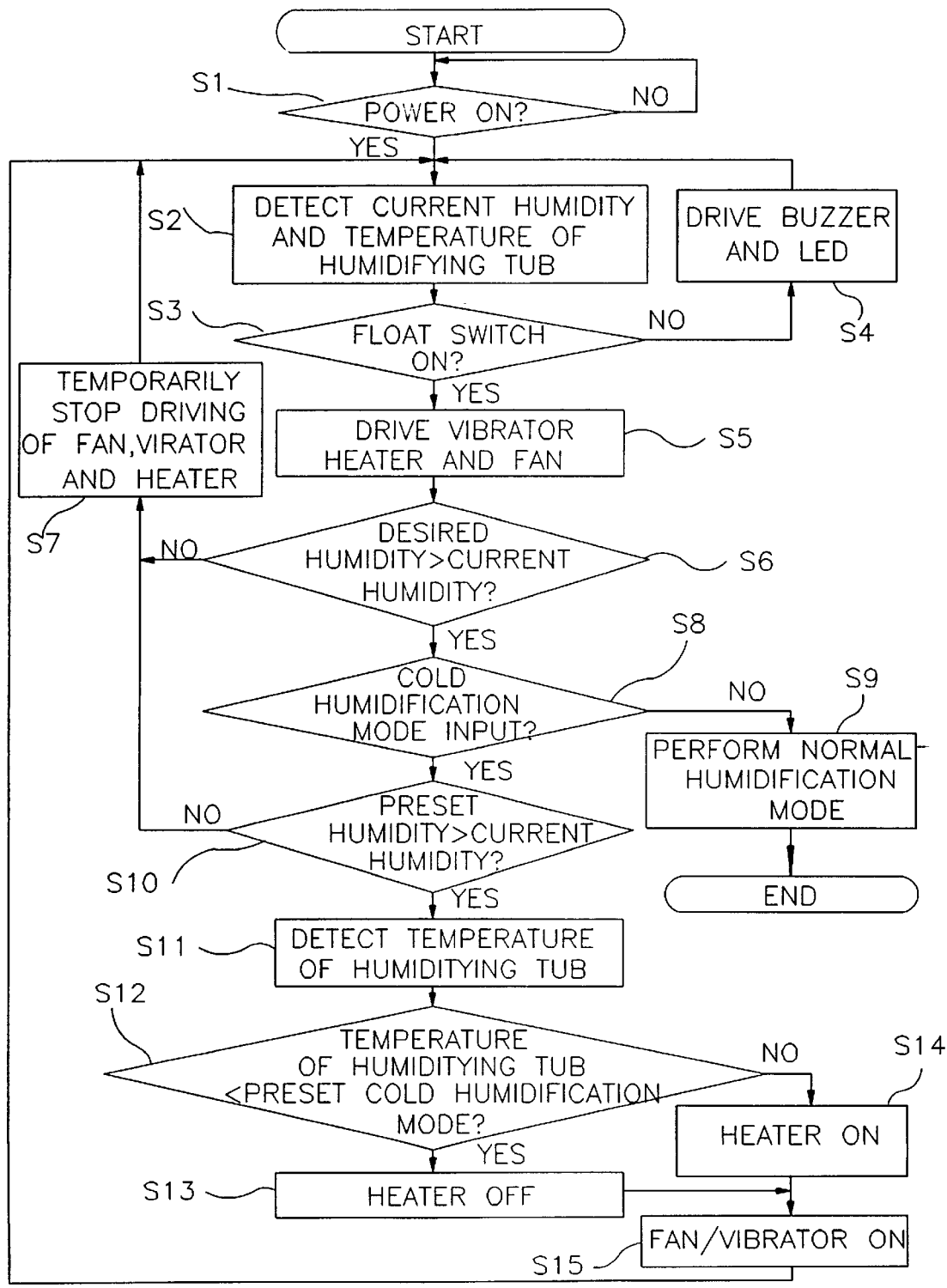

TEMPERATURE REGULATING METHOD OF A HUMIDIFIER ACCORDING TO A SURROUNDING TEMPERATURE

BACKGROUND OF THE INVENTION

1. Field of the Invention

The present invention relates to a method for automatically regulating humidify of a humidifier, and more particularly to a controlling method for regulating a temperature of water vapor ejected from a humidifier according to a surrounding temperature when setting a cool humidification mode.

2. Description of the Prior Art

Humidifiers are generally classified into a heating (heater) type and vibrator (ultrasonic) type in association with operating patterns. A schematic construction of the humidifiers will be described with reference to FIG. 1. Referring to FIG. 1, the humidifier includes a key input section 40 consisting of keys for setting overall operational mode of the humidifier by setting a desired humidity value of a space to be humidified by a user, and a humidity sensor 20 for sensing the indoor humidity of the space to be humidified. In addition to these, a float switch section 30 performs on/off switching operations in view of the level of water introduced into a humidifying tub, and a heater driving section 60 controls the driving of a heater for maintaining the desired humidity set by means of key input section 40. Also, a vibrator driving section 70 controls the driving of a vibrator, and a fan driving section 80 controls the operation of a fan that externally ejects water vapor having been generated by the vibrator and then heated by the heater. First and second temperature sensors 10 and 110 for sensing temperatures of the humidifying tub and surroundings, and a microprocessor 50 for controlling overall operations of above-described constituents in accordance with a preset control program are also furnished.

An operation of the conventional humidifier constructed as above will be described with reference to a flow chart shown in FIG. 2 as below.

Once an electric power is supplied to the humidifier (S100), humidity sensor 20 senses the humidity value of the indoor space and first temperature sensor 10 senses the temperature of the inside of the humidifying tub in accordance with a control instruction of microprocessor 50 (S101). Then, float switch section 30 decides whether the level of the water within the humidifying tub is in the status of shortage(S102). In case of the status of shortage of water, overall operation of the humidifier is suspended to be stand-by until the humidifying tub is filled with water. Also, in order to inform the user of the status of shortage of water, a driving signal is provided to a buzzer driving section 100 and a LED driving section 90 for alarming a buzzer sound and for driving a LED to warn the status of shortage of water in the humidifying tub.

If water is left within the humidifying tub, microprocessor 50 provides a driving signal to vibrator driving section 70, fan driving section 80 and heater driving section 60 to drive the vibrator, fan and heater (S104). After this, a preset temperature value supplied by the user via key input section 40 is compared with a temperature value of the humidifying tub detected by first temperature sensor 10 to decide whether the temperature value of the humidifying tub is higher than the preset temperature value (S105).

When the temperature value within the humidifying tub is lower than the preset temperature value in step S105, the driving state of the vibrator, fan and heater is continuously maintained (S104) since the temperature of the water introduced into the humidifying tub should be continuously raised. Whereas, if the temperature value within the humidifying tub is higher than the preset temperature value, microprocessor 50 supplies a stop signal to heater driving section 60 for stopping the operation of the heater solely among the previously-driven vibrator, fan and heater, thereby preventing the temperature rise at the water introduced into the humidifying tub.

As described above, the conventional humidifiers carry out the humidifying function in such a manner that the heater is operated to heat the water introduced into the humidifying tub, using the temperature set by the user. However, the above-stated conventional humidifiers have a drawback of being operated in accordance with the temperature set by the user regardless of the nearby humidity to be operated unconcerned with the surrounding atmosphere.

SUMMARY OF THE INVENTION

It is an object of the present invention to provide a method for operating a humidifier according to a surrounding temperature, wherein a cool humidification mode is added to the typical operating method, and, once the cool humidification mode is set, a temperature of water supplied to a humidifying tub is dropped/raised in accordance with a surrounding temperature for maintaining a constant temperature so as to allow a temperature of water vapor ejected from an ejection slit of the humidifier to maintain the constant temperature.

To achieve the above object of the present invention, a temperature regulating method of a humidifier is performed by the steps of deciding whether a humidification mode is shifted into a cool humidification mode during performing a humidifying operation of the humidifier. Then, a temperature of a humidifying tub is detected when the humidification mode is shifted into the cool humidification mode in the deciding step, and the detected temperature is compared with a temperature preset for performing the cool humidification mode. After this, a step of controlling on/off operations of a heater for heating water within the humidifying tub in accordance with the result of the comparing step is executed.

By the foregoing temperature regulating method of the humidifier, the temperature of the water is dropped/raised in accordance with the surrounding temperature to make it possible to maintain the constant temperature.

BRIEF DESCRIPTION OF THE DRAWINGS

The above objects and other advantages of the present invention will become more apparent by describing in detail preferred embodiments thereof with reference to the attached drawings in which:

FIG. 3 is a schematic flow chart for explaining a temperature regulating method of a humidifier according to the present invention.

DETAILED DESCRIPTION OF THE PREFERRED EMBODIMENT

A temperature regulating method of a humidifier according to the present invention will be described in more detail with reference to FIG. 3 hereinbelow.

Figure 1:
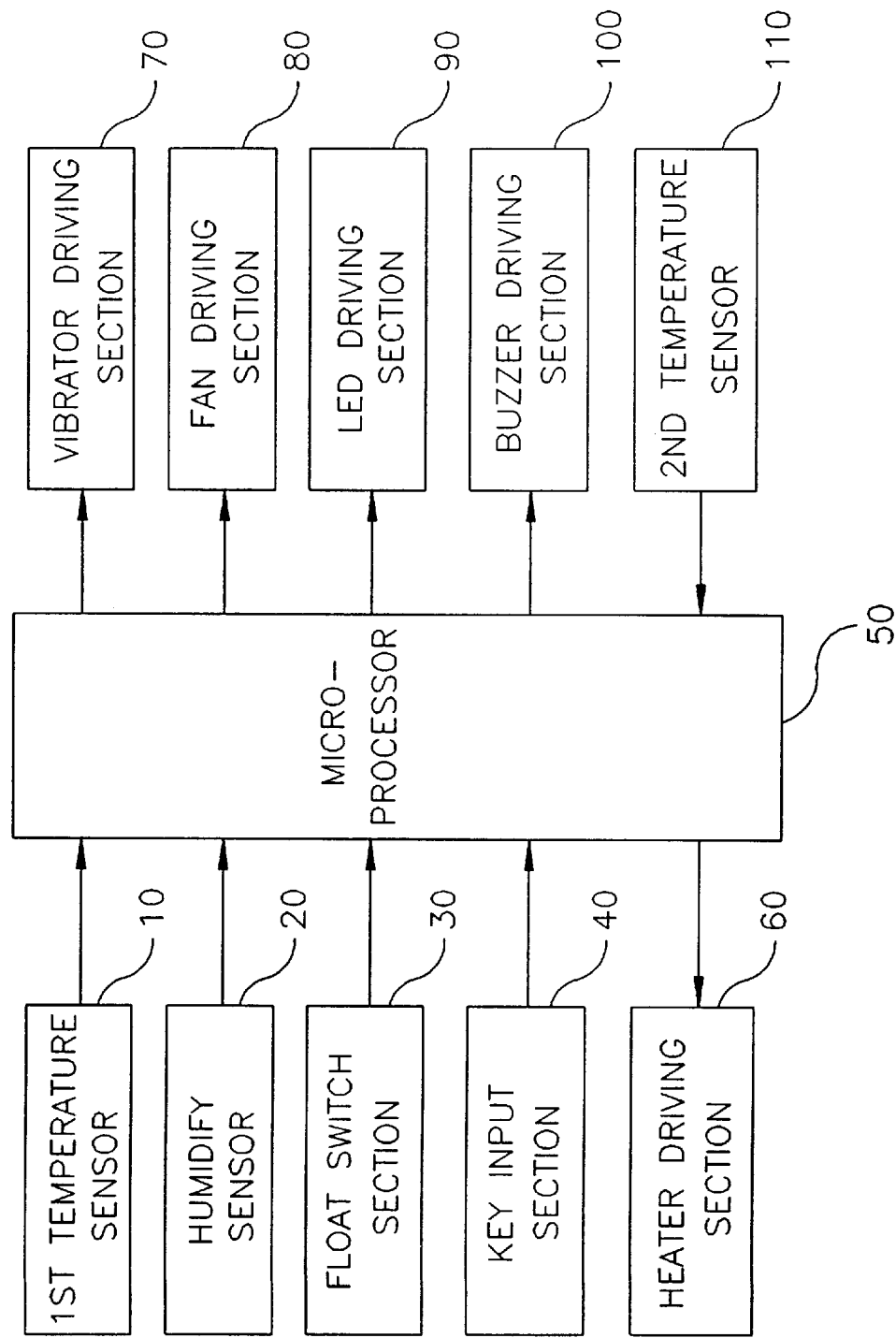
FIG. 1 is a schematic block diagram showing a conventional humidifier.
Figure 2:
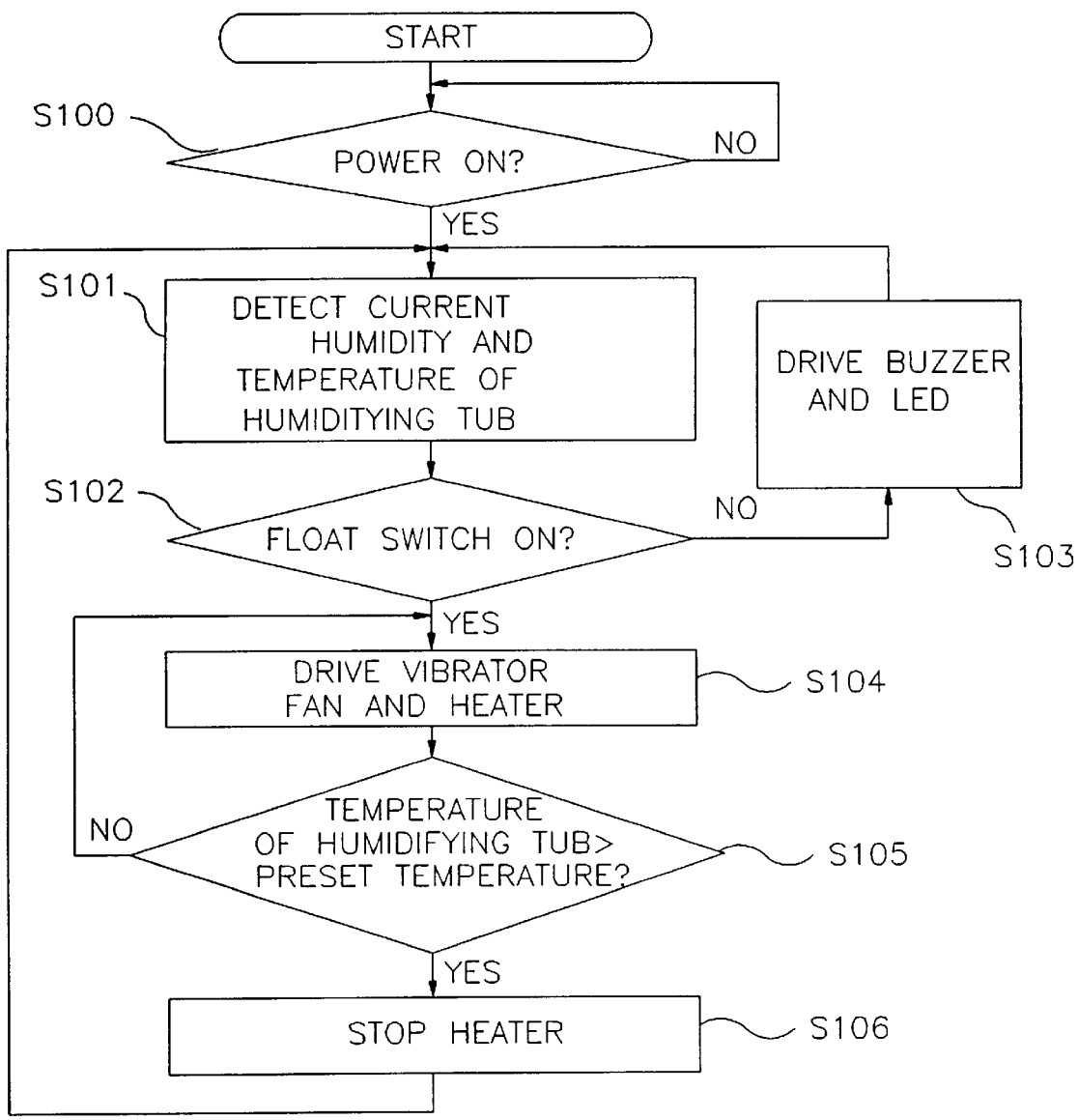
FIG. 2 is a operational flow chart of the conventional humidifier.

The construction of the humidifier for effecting the present invention is almost the same as shown in FIG. 1. Therefore, the descriptions with respect to the construction and corresponding operation are similar to those of the above-described one, which thus will be omitted. One difference of them is that a key for setting an operational mode of the humidifier into a cool humidification mode is further furnished into key input section 40, and an input of a preset temperature value when being set to the cool humidification mode is performed by using existing input keys.

An operation of the humidifier having the above-stated construction will be described in connection with a flow chart of FIG. 3.

When a user manipulates keys of key input section 40 to initiate the operation of the humidifier (S1) and sets an operational environment of the humidifier such as a desired humidity value and a temperature value, microprocessor 50 that recognizes the above operation stores these data in a memory (not shown). Once the data is stored, microprocessor 50 provides a driving signal to a display section (not shown) for informing the user of the storing state to display the key input state or set operational environment of the humidifier on the display section.

Also, in accordance with an operating instruction of the user, microprocessor 50 supplies a control signal to humidity sensor 20 for detecting the humidity value of a space to be humidified and utilizes first temperature sensor 10 for detecting the temperature throughout the inside of the humidifying tub (S2).

Successively, the state of float switch section 30 is detected to decide whether the water is left within the humidifying tub installed with the vibrator (S3). If there is no water, microprocessor 50 stops the operation of the humidifier while supplying the driving signal to buzzer driving section 100 and LED driving section 90 to operate the buzzer and LED (S4), thereby informing the user of the status of the humidifying tub in the shortage of water. If the waterlevel of the water is higher than a predetermined waterlevel, the driving signal is supplied to vibrator driving section 70, fan driving section 80 and heater driving section 60 to drive the vibrator, fan and heater.

Once the initial operation of the humidifier is normally conducted, microprocessor 50 compares a desired humidity supplied by the user with a current humidity (S6). When the desired humidity is lower than the current humidity, the driving of the fan, vibrator and heater is temporarily stopped (S7), microprocessor 50 returns to step S2 to repeat above-described steps. This is because there is no need to further supply the humid air since the humid air is distributed nearby to lead the current humidity to be higher than the desired humidity.

However, if the desired humidity is higher than the current humidity, the operation of the humidifier is continuously performed since the humid air is required to be supplied further.

During operating, microprocessor 50 decides whether an input for shifting into a cool humidification mode via key input section 40 exists (S8) to continuously carry out a normal humidification mode if there is no input for shifting into the cool humidification mode (S9). Whereas, if the input exists, current mode is shifted into the cool humidification mode, and an optionally-selected favorable humidity is compared with the current humidity value detected by humidity sensor 20 (S10).

Since the surrounding air is sufficiently supplied with the humidity when the preset favorable humidity is lower than the current humidity in step S10, the operation of the vibrator, heater and fan is stopped (S7), thereby returning to step S2 to repeat the foregoing steps.

However, if the preset favorable humidity is higher than the current humidity, further humidity should be afforded to nearby atmosphere. Also, because the current mode is of the cool humidification mode, the temperature of the humidifying tub is detected for constantly maintaining the water vapor ejected through the ejecting slit (S11).

The detected temperature of the humidifying tub is compared with a favorable cool humidification temperature (S12). When the temperature of the humidifying tub is higher than the favorable cool humidification temperature in step S12, the operation of the heater is stopped (S13) due to the fact that the temperature of the water vapor ejected through the ejecting slit becomes higher than the favorable cool humidification temperature. Whereas, if the temperature of the humidifying tub is lower than the favorable cool humidification temperature, the heater is to be on (S14) because the temperature of the water supplied into the humidifying tub is to be raised up to reaching the preset favorable cool humidification temperature. At this time, the favorable cool humidification temperature is generally set to 17°~23° C. In this manner, the on/off operations of the heater are controlled and the fan and vibrator maintain the operation under the on state in association with the temperature of the humidifying tub and favorable cool humidification temperature (S15).

In order to permit the humidifier to perform the operational mode of the general humidifier when the temperature of the humidifying tub is high, as described above, the heater is controlled to maintain the on state and the fan and vibrator maintain the on state, but the vibrator is controlled to operate in a strong mode for more effectively conducting the humidifying function which is the main function of the humidifier.

However, if the temperature of the humidifying tub is lower than the favorable cool humidifying temperature, the heater is controlled to maintain the off state and the fan/vibrator maintain the on state so as to allow the humidifier to execute the favorable cool humidification mode, in which, however, the vibrator is controlled to operate in a weak mode for assisting the humidifier to more effectively perform the favorable cool humidification mode.

Therefore, the operation of the heater, fan and vibrator to adjust the temperature of the water vapor ejected through the ejecting slit of the humidifier, so that the water vapor is ejected into the atmosphere while having the preset favorable temperature value. In other words, when the surrounding temperature is lower than the favorable cool humidification temperature value, the driving of the heater, fan and vibrator is controlled to eject the water vapor having the temperature value capable of raising the indoor temperature into the atmosphere. Whereas, if the surrounding temperature is higher than the favorable cool humidification temperature is high, the water vapor having the temperature value capable of dropping the indoor temperature is ejected into the atmosphere with the consequence of regulating the temperature of the water vapor ejected through the ejecting slit of the humidifier in accordance with the surrounding temperature of the humidifier.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A temperature regulating method of a humidifier comprising the steps of:

deciding whether a humidification mode is shifted into a cool humidification mode during performing a humidifying operation of said humidifier;

detecting a temperature of a humidifying tub when said humidification mode is shifted into said cool humidification mode in said deciding step, and comparing the detected temperature with a temperature preset for performing said cool humidification mode; and controlling on/off operations of a heater for heating water within said humidifying tub in accordance with the result of said comparing step.

2. The temperature regulating method of a humidifier as claimed in claim 1, wherein said controlling step further comprises a step of changing an operational mode of a vibrator for changing said water within said humidifying tub into water vapor status in accordance with the result of said comparing step.

3. The temperature regulating method of a humidifier as claimed in claim 2, wherein said operational mode of said vibrator is of a strong mode when said temperature of said humidifying tub is higher than said preset temperature, and of a weak mode when said temperature of said humidifying tub is lower than said preset temperature.

4. The temperature regulating method of a humidifier as claimed in claim 1, wherein said controlling step turns on said heater when said temperature of said humidifying tub is higher than said preset temperature, and turns off said heater when said temperature of said humidifying tub is lower than said preset temperature.

* * * * *